United States Patent [19]
Kim et al.

[11] Patent Number: 5,848,901
[45] Date of Patent: Dec. 15, 1998

[54] APPARATUS AND METHOD FOR RECORDING AND REPRODUCING USER COMMENTS ON AND FROM VIDEO TAPE

[75] Inventors: Cheol-hong Kim, Kyungki-do; Hyun-jung Park, Suwon, both of Rep. of Korea

[73] Assignee: Samsung Electronics Co., Ltd., Kyungki-do, Rep. of Korea

[21] Appl. No.: 496,287

[22] Filed: Jun. 29, 1995

[30] Foreign Application Priority Data

Jun. 29, 1994 [KR] Rep. of Korea .................. 94 15189

[51] Int. Cl.$^6$ ............................................. G09B 7/00
[52] U.S. Cl. .................................... 434/362; 434/309
[58] Field of Search .................... 434/169, 312, 434/362; 273/138.1, 429–432; 360/27, 69; 386/1, 46, 83; 463/43

[56] References Cited

U.S. PATENT DOCUMENTS

| | | | |
|---|---|---|---|
| 3,934,226 | 1/1976 | Stone et al. | 434/308 X |
| 3,955,466 | 5/1976 | Goldmark | 434/319 X |
| 3,987,484 | 10/1976 | Bosche et al. | 434/307 R X |
| 4,060,915 | 12/1977 | Conway | 434/307 R |
| 4,354,841 | 10/1982 | Meeder | 434/319 X |
| 4,634,386 | 1/1987 | Tamaki | 434/323 |
| 4,689,022 | 8/1987 | Peers et al. | 434/307 R |
| 4,690,645 | 9/1987 | Ukisu | 434/309 |
| 4,710,130 | 12/1987 | Aarons et al | 434/319 X |
| 4,772,962 | 9/1988 | Tanaka et al. | 386/69 |
| 4,949,187 | 8/1990 | Cohen | 386/69 |
| 5,123,088 | 6/1992 | Kasahara et al. | 434/307 R X |
| 5,488,409 | 1/1996 | Yuen et al. | 360/27 X |
| 5,493,455 | 2/1996 | Miyoshi et al. | 360/60 |

FOREIGN PATENT DOCUMENTS

| | | | |
|---|---|---|---|
| 0222919 | 5/1987 | European Pat. Off. . | |
| 559422 | 9/1993 | European Pat. Off. | 434/319 |
| 6-175577 | 6/1994 | Japan | 434/319 |

OTHER PUBLICATIONS

Webster's II New Riverside University Dictionary (Houghton Mifflin 1988) p. 286.

Primary Examiner—Joe H. Cheng
Attorney, Agent, or Firm—Sughrue, Mion, Zinn, Macpeak & Seas, PLLC

[57] ABSTRACT

A recording and reproducing apparatus using a video tape includes a user interfacer for generating comment information in response to a user key input, a video cassette recorder for recording the comment information on a predetermined region in a video tape, a transmission interfacer for enabling the user interfacer and the video cassette recorder to a transmit and receive a signal therebetween and a display for displaying a signal reproduced from the video cassette recorder so that user can recognize the signal. This apparatus is particularly useful for an educational-purposed video system.

16 Claims, 2 Drawing Sheets

APPARATUS AND METHOD FOR RECORDING AND REPRODUCING USER COMMENTS ON AND FROM VIDEO TAPE

BACKGROUND OF THE INVENTION

1. Field of the Invention

The present invention relates to a video tape recording and reproducing apparatus, and particularly to an apparatus for recording and reproducing a signal on and from a video tape, using a user interfacer such as a personal computer and a video cassette recorder.

The instant application is based on Korean Patent Application No. 94-15189, which is incorporated herein by reference for all purposes.

2. Description of Related Art

A prior art technology using a video cassette recorder connected with a computer is disclosed in European patent laid-open publication No. 0,222,919 Al, issued on May 27, 1987. This prior art technology discloses a system for superimposing various character/pattern images on state/dynamic video images in a display of each terminal in various data communication systems, such as a videotex network, and displaying the superimposed images on the display. In this system, if a particular key on a keyboard in the user terminal equipment is manipulated, a corresponding block of image information stored in a memory within a main computer is read out from the memory, and a corresponding selection of the image information of a video picture is accomplished by the operation of the main computer connected to a video cassette recorder. In this manner, the video images and the character/pattern images are forcedly connected to each other in the terminal display.

SUMMARY OF THE INVENTION

It is an object of the present invention to provide an apparatus for recording and reproducing a user input key signal via an input console of a user interfacer on and from a video tape by connecting the interfaces, which may be; a personal computer, to a video cassette recorder.

Another object of the present invention is to provide an apparatus in which an answer and a solution procedure with respect to a test problem recorded on a video tape is recorded on the video tape via an input console of a user interfacer.

To accomplish the above object of the present invention, there is provided a video tape recording and reproducing apparatus comprising:

a user interfacer for generating comment information in response to a user key input; a video cassette recorder for recording the comment information on a predetermined region in a video tape; a transmission interfacer for enabling the user interfacer and the video cassette recorder to transmit and receive a signal therebetween; and means for displaying a signal reproduced from the video cassette recorder so that a user can recognize the signal.

To accomplish the other object of the present invention, there is provided an educational-purposed recording and reproducing apparatus comprising:

a video tape in which digital codes for discriminating test problem information, problem solution procedure information and answer information and recording the discriminated information and the test problem information is recorded on a predetermined region thereof; display means for displaying information reproduced from the video tape and enabling a user to recognize the displayed information; a video cassette recorder for reproducing a signal recorded on the video tape, interrupting a reproduction operation of a signal recorded on the video tape if the reproduced signal is a first digital code recorded on a front position of a portion where the answer information is recorded thereon or a second digital code recorded on a front position of a portion where the problem solution procedure information is recorded thereon, and recording applied information on a predetermined region of a rear position of a corresponding digital code in the video tape; a user interfacer for generating the problem solution procedure information or the answer information in response to a user key input; and a transmission interfacer for enabling the user interfacer and the video cassette recorder to transmit and receive a signal therebetween.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying FIGS. 1 and 2.

Figure 1:
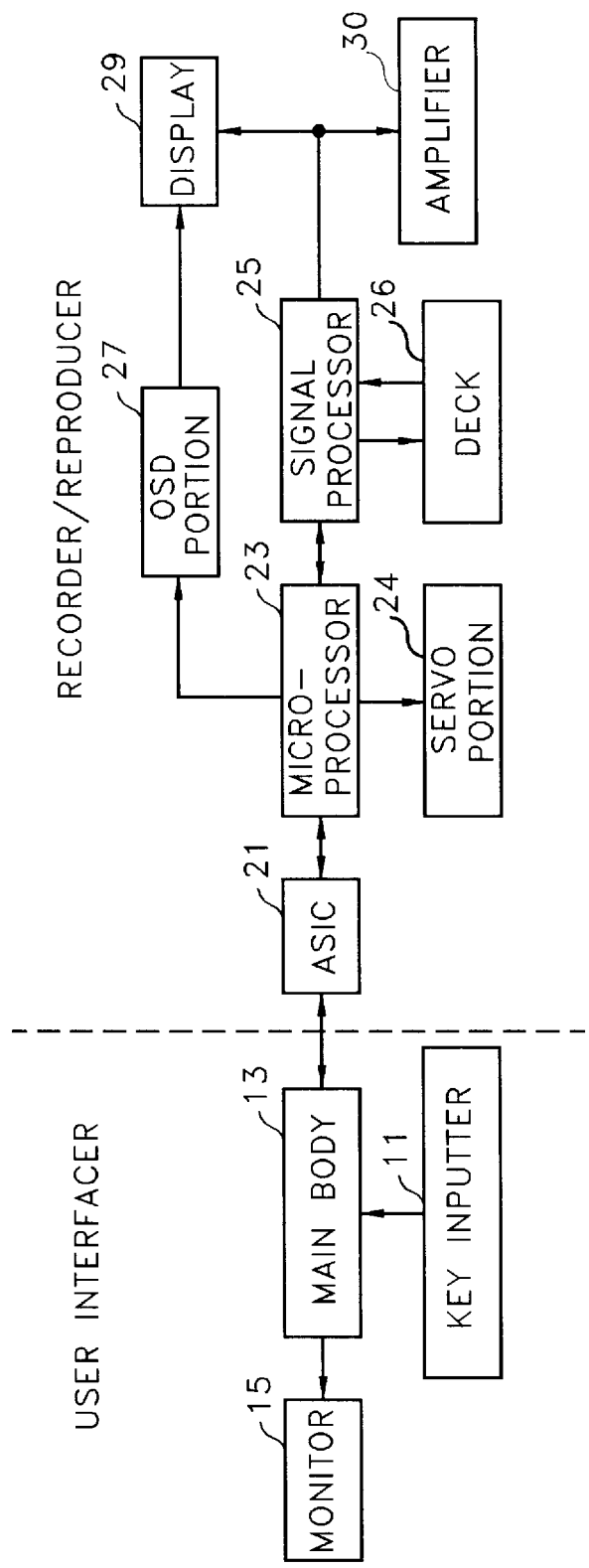
FIG. 1 is a block diagram showing an educational-purposed recording and reproducing apparatus which uses a video tape according to a preferred embodiment of the present invention.

FIG. 1 shows an educational-purposed video system according to a preferred embodiment of the present invention. The apparatus of FIG. 1 is comprised of a user interfacer and a recorder/reproducer, where a person applying for an examination can submit an answer with respect to a test problem recorded on a video tape, an estimator can estimate the answer and the person applying for the examination can see the estimated test problem. The user interfacer is a general computer system including a main body 13, a key inputter 11 (such as a keyboard) and a monitor 15. The main body 113 of this embodiment of the present invention displays the user input key signal (input via key inputter) 11 according to a signal supplied from the recorder/reproducer on monitor 15, and stores a program capable of transmitting the input key signal to the recorder/reproducer. The recorder/reproducer further comprises an application specific integrated circuit (ASIC) 21 for enabling information transmission between a general video cassette recorder and main body 13, a display 29 and an amplifier 30, in addition to the general video cassette recorder having a microprocessor 23, a servo portion 24, a signal processor 25, a deck portion 26 and an on-screen display (OSD) 27. Microprocessor 23 transmits and receives information to and from main body 13 via ASIC 21, and controls peripheral equipment. A deck portion 26 for transferring the video tape and writing or reading a signal on and from the video tape, a servo portion 24 for driving deck portion 26, a signal a processor 25 and an on-screen display 27 are included in the video cassette recorder of the recorder/reproducer, in addition to microprocessor 23.

Figure 2:
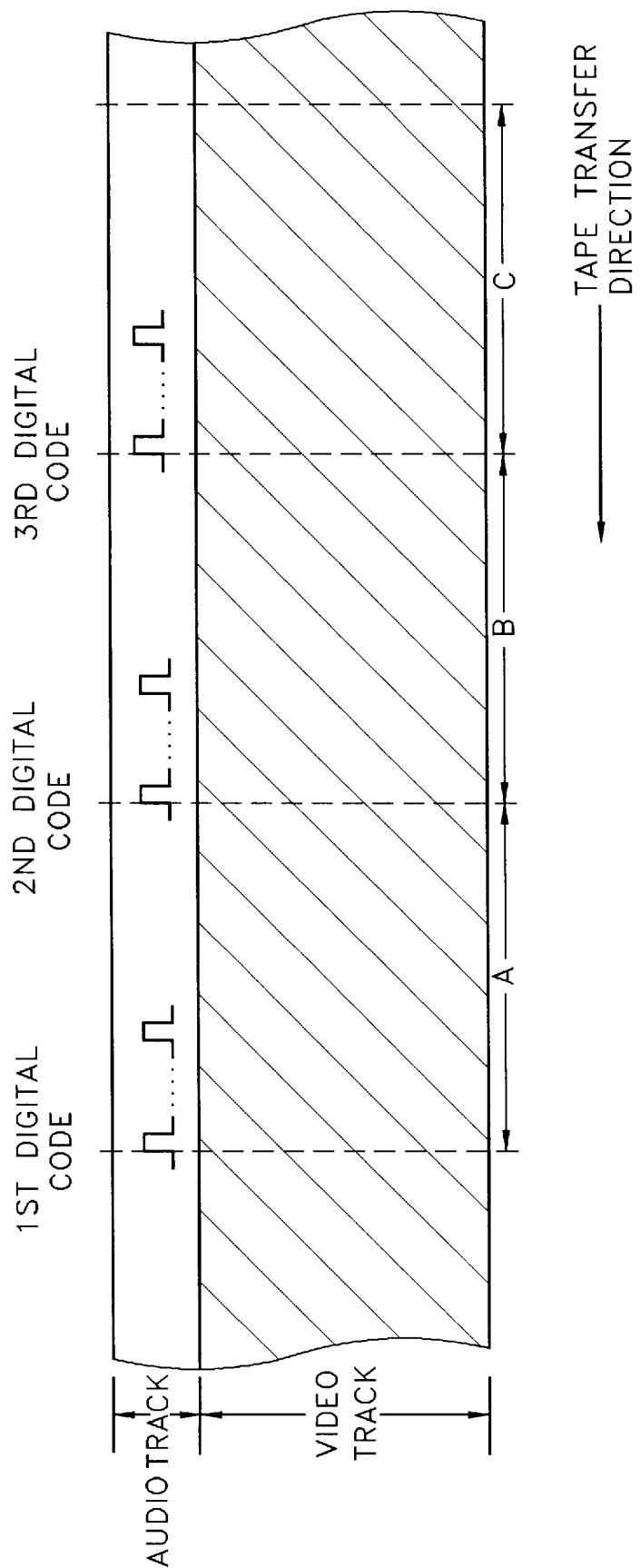
FIG. 2 shows a video tape showing a format in which digital codes are recorded on an audio track.

FIG. 2 shows a format in which a digital code for discriminating educational-purposed information is recorded on an audio track of the video tape according to a preferred embodiment of the present invention. In FIG. 2, an interval A shows a portion where problem information is recorded therein, an interval B, shows a portion where an estimator problem solution procedure information is recorded therein, and an interval C shows a portion where the answer information of the applicant for an examination is recorded therein. Digital codes for discriminating the intervals. A, B and C on a front position of the corresponding interval when manufacturing the video tape, that is, when initially recording the educational program, are recorded on the video tape used in the preferred embodiment of the present invention. More specifically, the respective digital codes are recorded on front positions of the corresponding intervals A, B and C of the audio track in A video tape, as shown in FIG. 2, respectively. A first digital code recorded on the front position of interval A, a second digital code recorded on the front position of interval B, and a third digital code recorded on the front position of interval C are shown in FIG. 2. The educational-purposed information, including problem information, problem solution procedure information and the answer information is also digitally coded and recorded on the audio track.

The operation of the FIG. 1 apparatus will be described below with reference to FIG. 2.

When the apparatus of FIG. 1 operates in a test application mode, microprocessor 23 in the recorder/reproducer controls deck portion 26 via servo portion 24, and reads out a signal recorded in the video tape. When the signals recorded on the audio track and the video track are supplied from deck portion 26, signal processor 25 separates digital coded signals from the signals in the audio track and outputs the separated signals to microprocessor 23. Signal processor 25 also processes the supplied video signal to output the processed video signal to display 29, and processes the supplied audio signal to output the processed audio signal to amplifier 30. A1 information is applied from signal processor 25 during this control, microprocessor 23 supplies the applied problem information to OSD portion 27. OSD portion 27 processes the applied problem information for screen display and supplies the processed problem information to display 29. Microprocessor 23 also transmits a first detection signal indicating that the first digital code has been detected to main body 13 via ASIC 21. ASIC 21 uses an RS-232-C interfact, which is a well-known standard related to data communication. Main body 13 takes on a waiting state for receiving an input key signal from key inputter 11 when the first detection signal input thereto. If the third digital code is detected from the digital signal during continuous travelling of the video tape, microprocessor 23 supplies a control signal for interrupting a transfer of the video tape to servo portion 24. Servo portion 24 controls deck portion 26 according to the control signal. Thus, the user or the test application can take an examination while looking at a video signal and a character/pattern which are simultaneously displayed via display 29. The user or the test application can take a hearing test in a foreign language while listening to an audio signal regenerated via amplifier 30.

If key inputter 11 is manipulated in user test participation mode main body 13 displays answer information according to the input key signals via monitor 15. At the same time, the answer information is transmitted to microprocessor 23 via ASIC 21. Microprocessor 23 supplies the received answer information to signal processor 25. Signal processor 25 digitally codes the applied answer information to record the answer information on the video tape, and then supplies the digital-coded answer information to deck portion 26. Deck portion 26, driven by servo portion 24, records the answer information on an audio track located in the rear position of the third digital code.

Since the apparatus of FIG. 1 when operating in an answer estimation mode, performs the same operation as that in the test application mode, the detailed description of the operation will be omitted. However, here the apparatus of FIG. 1 records problem solution procedure information on the rear position of the second digital code, rather than recording the answer information on the rear position of the third digital code.

As described above, the video tape recording and reproducing apparatus using a computer and the video cassette recorder according to the present invention can record user comments (of the user watching the signal reproduced from the video tape by the video cassette recorder) on the video tape using computer equipment such as a personal computer. The present invention is particularly useful as an educational-purposed system related to an examination application as in the above embodiment.

While only certain embodiments of the invention have been specifically described herein, it will apparent that numerous modifications may be made thereto without departing from the spirit and scope of the invention.

What is claimed is:

1. A recording and reproducing apparatus using a video tape comprising:

a user interfacer for generating comment information in response to a user key input;

a video cassette recorder for recording the comment information of a predetermined region in the video tape;

a transmission interfacer for enabling said user interfacer and said video cassette recorder to transmit and receive a signal therebetween; and means for displaying a signal reproduced from said video cassette recorder so that a user can recognize the signal.

2. The recording and reproducing apparatus according to claim 1, wherein said video cassette recorder further comprises:

a microprocessor for controlling said video cassette recorder to record the comment information on the predetermined region, said microprocessor controlling said video cassette recorder so that the comment information together with codes for discriminating the comment information supplied from said user interfacer via said transmission interfacer is recorded on the predetermined region of the video tape.

3. The recording and reproducing apparatus according to claim 2, wherein said predetermined region is a region in the video tape where an audio signal is recorded thereon.

4. The recording and reproducing apparatus according to claim 1, wherein said user interfacer is a personal computer having a monitor for displaying, on a screen of said monitor, the comment information generated in response to the user key input.

5. A recording and reproducing apparatus for educational purpose comprising:

a video tape in which digital codes for discriminating test problem information, problem solution procedure information and answer information as well as the discriminated information itself are recorded on a predetermined region thereof;

display means for displaying information reproduced from the video tape and enabling a user to recognize the displayed information;

a video cassette recorder for;

reproducing a signal recorded on the video tape, interrupting a reproduction operation of a signal recorded on the video tape if the reproduced signal is a first digital code recorded on a front position of a portion where the answer information is recorded thereon, or a second digital code recorded on a front position of a portion where the problem solution procedure information is recorded thereon, and recording applied information on a predetermined region of a rear position of a corresponding digital code in the video tape;

a user interfacer for generating either the problem solution procedure information or the answer information in response to a user key input; and a transmission interfacer for enabling said user interfacer and said video cassette recorder to transmit and receive a signal therebetween.

6. The recording and reproducing apparatus according to claim 5, wherein said predetermined region is a region in the video tape where an audio signal is recorded thereon.

7. The recording and reproducing apparatus according to claim 6, wherein said predetermined region is a region on an audio track.

8. The recording and reproducing apparatus according to claim 7, wherein said test problem information, said problem solution, procedure information and said answer information are digitally coded and recorded on said audio track.

9. The recording and reproducing apparatus according to claim 5, wherein said video cassette recorder comprises:

a deck portion for driving said video tape;

a servo portion for driving said deck portion;

a signal processor for reproducing the signal read from said video tape via said deck portion, supplying the reproduced signal to said display upon separation of the first and second digital codes, the test problem information, the problem solution procedure information and the answer information from the reproduced signal;

an on-screen display generator for processing the test problem information, the problem solution procedure information and the answer information for on-screen display on said display means; and a microprocessor for controlling said servo portion according to the digital code contained in the data separated by said signal processor.

10. The recording and reproducing apparatus according to claim 9, wherein said microprocessor operates in an examination application mode for controlling said servo portion so that the video tape is prevented from playback until the answer information is supplied from said user interfacer, and the answer information is recorded on a position following the position of the video tape where the first digital code has been recorded thereon if the answer information is supplied, when the first digital code is contained in the separated data, and wherein said microprocessor operates in an answer estimation mode for controlling said servo portion so that the video tape is prevented from playback until the problem solution procedure information is supplied from said user interfacer, and that the problem solution procedure information is recorded on a position following the position of the video tape where the second digital code has been recorded thereon if the problem solution procedure information is supplied, when the second digital code is contained in the separated data.

11. The recording and reproducing apparatus according to claim 5, wherein said user interfacer further comprises a monitor for displaying the answer information generated in response to the user key input.

12. The recording and reproducing apparatus according to claim 5, wherein said user interfacer is a personal computer.

13. A method of using a video tape to record and reproduce information comprising:

(a) generating comment information in response to a key input by a user;

(b) recording the comment information using a video cassette recorder on a predetermined region of the video tape;

(c) transmitting and receiver a signal between the user and said video cassette recorder; and (d) displaying a signal reproduced from said video cassette recorder so that the user can recognize the signal.

14. A method of using a video tape to record and reproduce information according to claim 13, wherein said step (b) further comprises:

controlling said video cassette recorder to record the comment information on the predetermined region.

wherein said comment information together with codes for discriminating the comment information supplied from said user during transmission and reception are recorded on the predetermined region of the video tape.

15. A method of using a video tape to record and reproduce information according to claim 14, wherein step (b) further comprises:

recording said comment information on a region in the video tape where an audio signal is recorded thereon.

16. A method of using a video tape to record and reproduce information according to claim 13, wherein step (a) further comprises:

generating said comment information upon a personal computer in response to said user key input.

* * * * *